United States Patent [19]

Matsushita et al.

[11] Patent Number: 4,865,434
[45] Date of Patent: Sep. 12, 1989

[54] ZOOM LENS CAPABLE OF SELECTING A FOCAL LENGTH BEYOND A STANDARD FOCAL LENGTH RANGE

[75] Inventors: Takashi Matsushita, Kanagawa; Sadatoshi Takahashi; Nozomu Kitagishi, both of Tokyo; Keiji Ikemori; Tsunefumi Tanaka, both of Kanagawa, all of Japan

[73] Assignee: Canon Kabushiki Kaisha, Tokyo, Japan

[21] Appl. No.: 782,584

[22] Filed: Oct. 1, 1985

[30] Foreign Application Priority Data

Oct. 1, 1984 [JP] Japan ............................ 59-205891
Feb. 4, 1985 [JP] Japan ............................ 60-019440

[51] Int. Cl.⁴ ............................................. G02B 15/00
[52] U.S. Cl. ...................................... 350/430; 350/427
[58] Field of Search ................. 350/423, 427, 428, 430

[56] References Cited

U.S. PATENT DOCUMENTS

| | | | |
|---|---|---|---|
| 3,481,666 | 12/1969 | Higuchi | 350/427 |
| 3,661,445 | 5/1972 | Someya | 350/428 |
| 4,178,076 | 12/1979 | Tsuji et al. | 350/423 |
| 4,256,371 | 3/1981 | Someya | 350/423 |
| 4,298,251 | 11/1981 | Hartmann | 350/428 |

FOREIGN PATENT DOCUMENTS

| | | | |
|---|---|---|---|
| 222910 | 11/1960 | Austria | 350/427 |
| 4022 | 1/1980 | Japan | 350/427 |
| 55-32046 | 3/1980 | Japan . | |
| 57-42010 | 3/1982 | Japan . | |
| 52214 | 3/1984 | Japan | 350/428 |

Primary Examiner—Deborah L. Kyle
Assistant Examiner—Michael J. Carone
Attorney, Agent, or Firm—Fitzpatrick, Cella, Harper & Scinto

[57] ABSTRACT

A zoom lens including, from front to rear, a first lens unit of positive power, a second lens unit of negative power and a third lens unit of positive power, wherein for a standard focal length range at least the first and second lens units move simultaneously and independently of each other, and to obtain a focal length beyond the standard range, at least the second lens unit moves, whereby the locus of movement of the first lens unit bends at an end of the standard range, and as the standard range is exceeded, the first lens unit either remains stationary or moves forward.

13 Claims, 11 Drawing Sheets

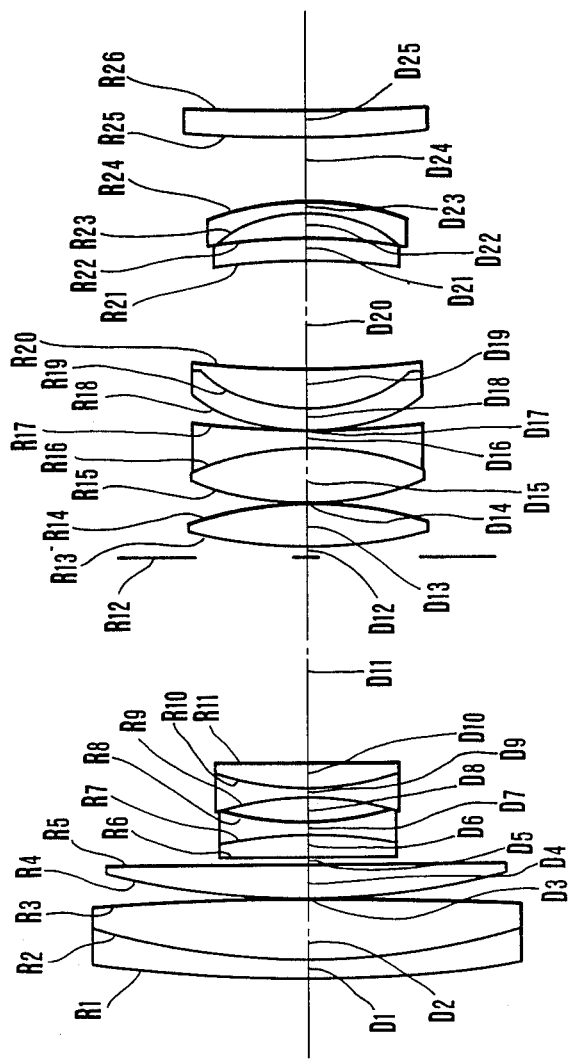

ZOOM LENS CAPABLE OF SELECTING A FOCAL LENGTH BEYOND A STANDARD FOCAL LENGTH RANGE

BACKGROUND OF THE INVENTION

1. Field of the Invention

This invention relates to a method of varying the focal length of a zoom lens, and more particularly to zoom lenses having two zooming methods for first and second variations of the focal length suited to still cameras, cinematic cameras or video cameras. Still more particularly, it relates to zoom lenses in which the first variation of the focal length is carried out by the usual method, and the second variation of the focal length is carried out by a different method from that of the first variation to obtain a longer value of the focal length than when in the first variation.

2. Description of the Prior Art

In the past, there have been proposed many methods of extending the range of variation of the focal length of a zoom lens. For example, in Japanese Laid-Open Patent Application No. SHO 57-42010, a rear converter lens unit is inserted into a space between the zoom lens and the image plane to increase the focal length of the entire system, or the so-called rear converter method is used. Another Japanese Laid-Open Patent Application No. 55-32046 proposes the afocal converter method for increasing or decreasing the focal length of the entire system by attaching a lens unit of infinite focal length to the front of a zoom lens.

The rear converter method is advantageous to take the telephoto ratio at relatively small values, but gives rise to an increase in the complexity of structure and the size of the combined system because the rear converter must be well corrected for all aberrations in itself. The afocal converter method, on the other hand, though being easily amenable both to decrease and increase the focal lengths of the zooming range, tends greatly to increase the diameter of the lens unit.

Another or common disadvantage of these two methods is that besides the zoom lens as the basic unit, the attachment lens must always be at hand and, therefore, snap-shooting and portability are not very good.

The other method of extending the range is by increasing the zoom ratio. For example, the total zooming movement is increased, or the refractive power of the zoom unit is strengthened, or the number of zoom units is increased. Any of these methods has, however, a tendency of increasing the total length of the lens, producing large aberrations over the zooming range, or making it difficult to maintain aberration corrections stable throughout the extended range.

It has already been known in the art to change the loci of movement of the zoom units for the purpose of extending the range in U.S. Pat. No. 4,256,371. In this zoom lens, however, the front lens unit remains stationary in that part of the range which may be regarded as basic, or standard.

SUMMARY OF THE INVENTION

An object of the present invention is to provide a zoom lens capable of obtaining a focal length beyond a standard zooming range.

Another object is to provide a zoom lens operating with selection of two different modes of varying the focal length to extend the range, while still permitting minimization of the bulk and size of the entire system, thereby giving an advantage of excellent snap-shooting and portability even at the extended focal length.

To attain these objects, according to the invention, a zoom lens including at least three lens units with the first or front lens unit of positive power, the second or middle lens unit of negative power and the third or rear lens unit of positive power is made to operate in a first mode of varying the focal length by varying the axial air separations between the first and second and between the second and third lens units, and a second mode by moving the second lens unit from the telephoto position of the first mode across a point of a lateral magnification of $-1x$.

Still another object is to provide a zoom lens including at least three lens units or, from front to rear, a first lens unit of positive power, a second lens unit of negative power and a third lens unit of positive power in which the first lens unit moves axially at a constant speed while the second lens unit moves axially at varying speeds to effect zooming for first variation of the focal length, and the first and second lens units further move axially in respective loci which start to differ from those for the first variation of the focal length at or near the telephoto position of the first variation of the focal length across a point either at which the first and second lens units estabilish no image forming relationship, or at which the reciprocating movement of the first lens unit for the extended range changes its direction.

BRIEF DESCRIPTION OF THE DRAWINGS

FIGS. 11 and 13 are block diagrams of examples 3. and 4 of specific zoom lenses of the invention respectively.

DETAILED DESCRIPTION OF THE PREFERRED EMBODIMENTS

Figure 1:
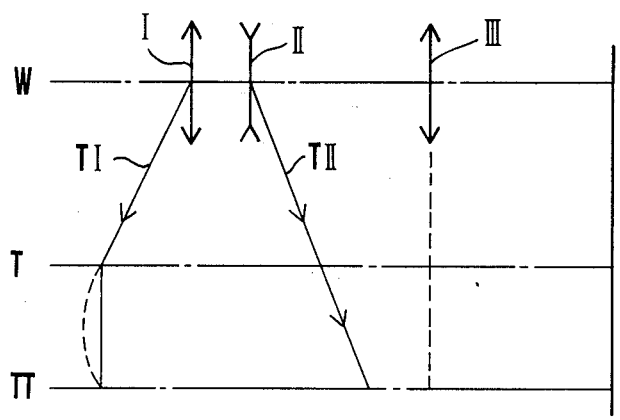
FIGS. 1 and 2 are diagrams of the optical arrangements of first and second embodiments of the present invention.

The present invention will next be described in connection with embodiments thereof by reference to the drawings. In FIG. 1 there is shown a first embodiment of the invention and particularly what zooming movement is made to extend the range in a graph where the axial positions of zoom units are in a lateral axis and the variation of the focal length is in a vertical axis. In this embodiment, the zoom lens comprises, from front to rear, a first (front) lens unit I of positive power, a second (middle) lens unit II of negative power and a third (rear) lens unit III of positive power, whereby the first and second units I and II are moved axially forward and rearward respectively so as to depict loci TI and TII when the focal length is varied in a first mode from a minimum value at the wide angle (W) end to a maximum value at the telephoto (T) end, and then the second unit II only is further moved rearward from the telephoto position T of the first mode of variation of the focal length when the focal length is varied in a second mode to a super telephoto end TT.

In this embodiment, the second mode of variation of the focal length is operated by moving the second lens unit II in a path beginning with a position just beyond the telephoto end T of the first mode and including another position at which the lateral magnification of the second lens unit II takes $-1x$. This makes it possible that despite the shortening of total movement of the second lens unit II, a prescribed value of the zoom ratio is advantageously obtained. And, in the second mode, the lateral magnification of the second lens unit II changes from a value $\beta$ at the start of movement to another value $1/\beta$ at the termination of movement, thereby the zoom ratio of the entire system is extended $1/\beta^2$ times Since, in this embodiment, the second lens unit II is made only to contribute to the second mode, the zoom lens is not permitted to shoot when half on the way in view of simplifying the structure of an operating mechanism for the second lens unit II as its locus of movement is linear as shown in FIG. 1.

In other words, to allow for effective use of any station in the entire extended range of movement of the second lens unit II, the first lens unit I must be reciprocatingly moved with change of its direction near a point at which the lateral magnification of the second lens unit II becomes $-1x$ as shown by a dashed line curve. This causes the operating mechanism to employ an in-and-out cam. To avoid this disadvantage, in this embodiment, only both ends of the second range of variation of the focal length, namely, the telephoto end T and the super telephoto end, are made useful. Thereby, as a linear cam suffices for controlling each zooming movement, the structure of construction of the operating mechanism is very simplified.

Also, in this embodiment, the first lens unit I of positive power is moved forward to vary the focal length of the entire system, it thus being made easy to admit as large an oblique beam as the axial beam during zooming with the limitation of the diameter of the front lens unit I to a minimum. The movement of the first lens unit I has another effect that the contribution of the movement of the second lens unit II to a variation of the image magnification is accentuated, thus contributed to an increase in the range of variation of the image magnification.

It is to be noted that in this embodiment the third lens unit III may be made to move When in the standard zooming range with an advantage of facilitating an improvement of the stability of good correction of aberrations throughout the standard zooming range.

To extend the standard range, according to this embodiment, it is only necessary to impart into the second lens unit II an independent movement. This produces an advantage that the total length of the lens is prevented from increasing. Thus, an increase in the zoom ratio can be achieved while still preserving the bulk and size of the zoom lens as a whole at a minimum.

Figure 2:
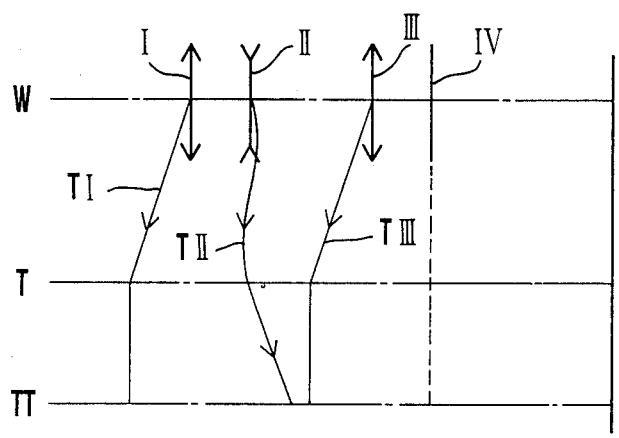
Figure 3:
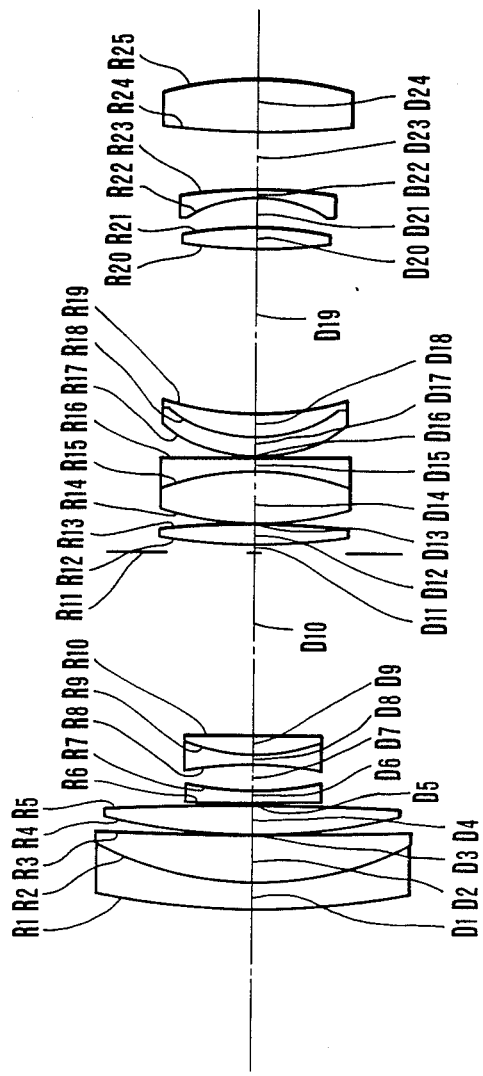
FIGS. 3 and 5 are lens block diagrams of examples 1 and 2 of specific zoom lenses of the invention respectively.
Figure 4A:
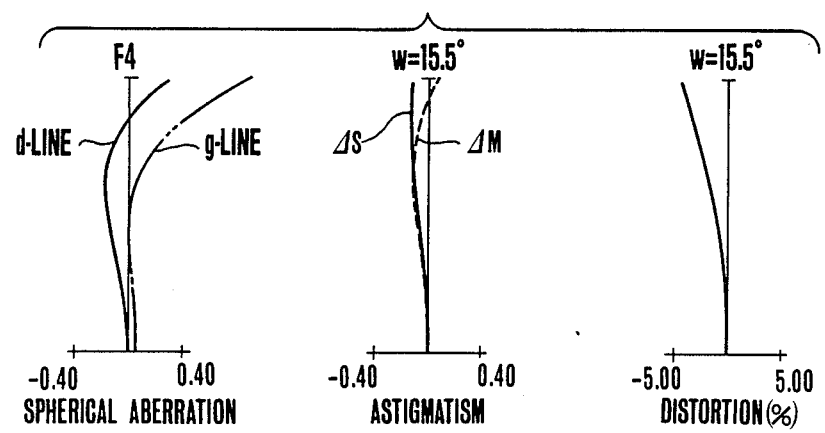
FIGS. 4A to 4C and 6A to 6C are graphic representations of the various aberrations of the lenses of FIGS. 3 and 5 respectively.
Figure 4B:
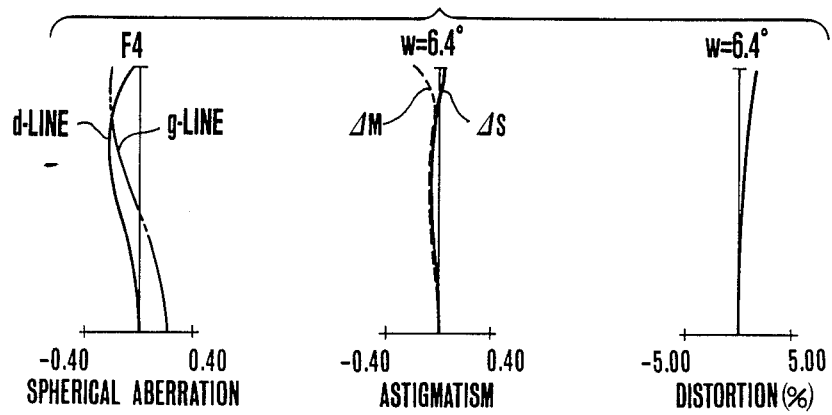
Figure 4C:
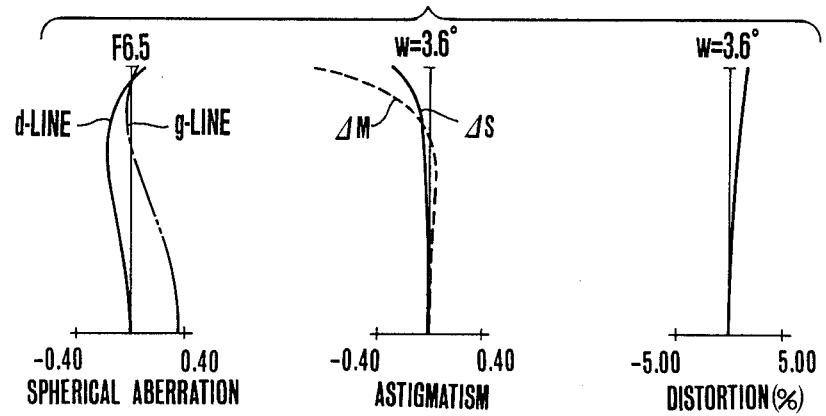
Figure 5:
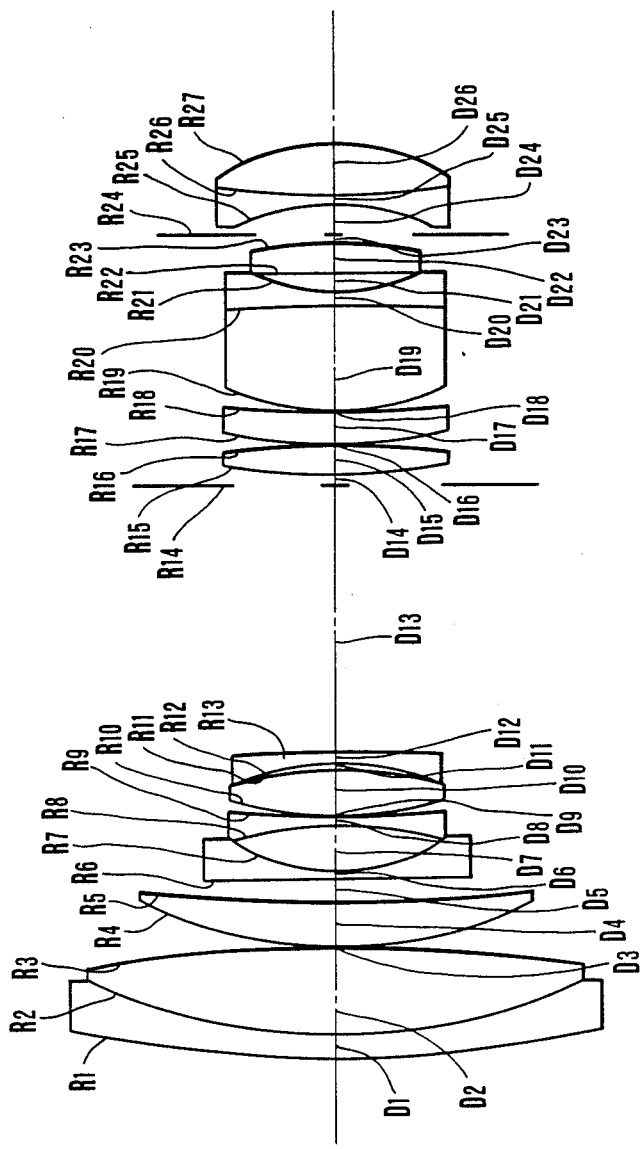
Figure 6A:
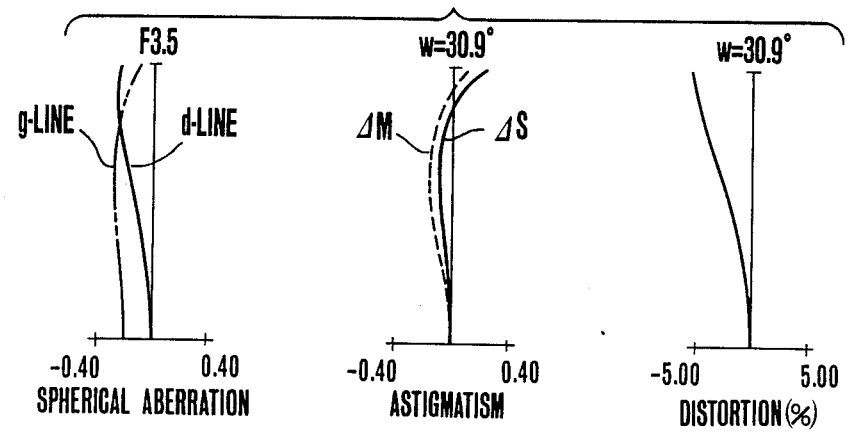
Figure 6B:
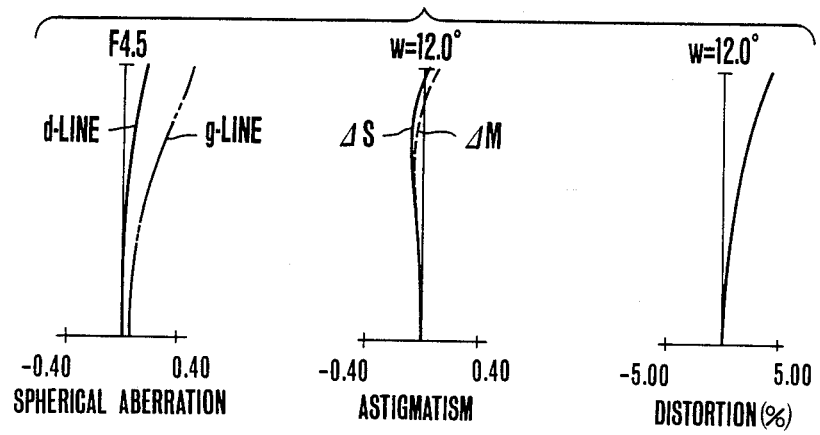
Figure 6C:
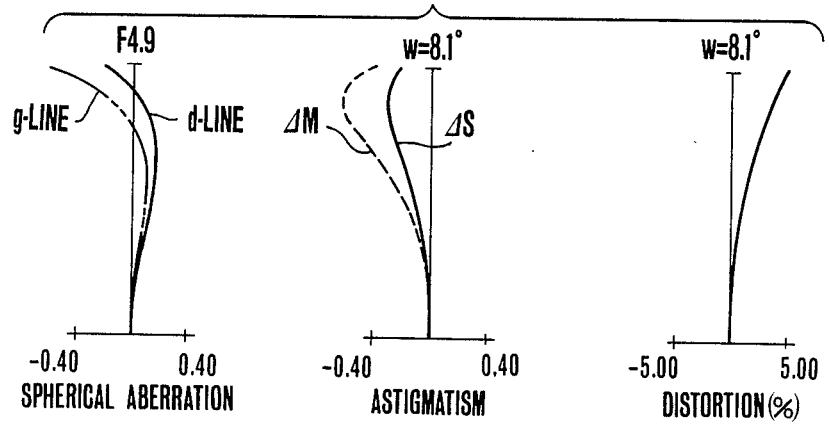

FIG. 2 schematically illustrates the optical arrangement of a second embodiment of the invention. The zoom lens of FIG. 2 is constructed with four lens units I to IV of positive, negative, positive and positive powers in this order from front, the first and third lens units I and III being moved axially forward so as to depict linear loci TI and TIII respectively, while the second lens unit II being simultaneously moved axially so as to depict a nonlinear locus TII, to vary the focal length of the entire system for a first range from a wide angle end W to a telephoto end T. For a second range of variation of the focal length, only the second lens unit II is moved axially from the telephoto position of the first range rearward to a super telephoto end TT. In this embodiment, too, similarly to the FIG. 1 embodiment, the path of movement of the second lens unit II for the second range includes a position at which the lateral magnification of the second lens unit II takes a value of $-1x$, thereby it being made possible to minimize the required additional movement of the second lens unit II for the prescribed zoom ratio. It should be pointed out here that the second lens unit II is additionally moved until its lateral magnification reaches a value of $1/\beta$ where $\beta$ is the value at the start of additional movement. This enables the zoom ratio of the entire system to increase by $1/\beta^2$.

In this embodiment, as the first and third lens units I and III further move beyond the telephoto position T, there is a position at which no solution for a real movement of the second lens unit II is found, or variation of the focal length becomes impossible to realize. For this reason, in this embodiment, similarly to the embodiment of FIG. 1, only both terminal ends of additional movement of the second lens unit II are made useful. This allows for linear movement of the second lens unit II, thereby the complexity of the structure of construction of the operating mechanism is reduced.

Though, in this embodiment, the fourth lens unit IV is not particularly necessary to use, the use of it becomes preferred when it is desired to minimize the various aberrations over the entire zooming range.

For note, in both embodiments of FIGS. 1 and 2, the initiation of the second zooming range is not always necessary to coincide with the termination of the first zooming range or the telephoto end T, but may be taken at a zooming position of relatively little aberrations near the telephoto end T.

In the present invention, to minimize the variation of aberrations throughout the second zooming range and to reduce the required additional axial movement of the second lens unit II for the prescribed zoom ratio, it is desirable to satisfy the following condition:

$$0.7 \leq |\beta| \leq 0.95 \quad \ldots (1)$$

where $\beta$ is the lateral magnification of the second lens unit II in the telephoto end T of the first zooming range.

When the second zooming range begins with a smaller value of the lateral magnification beyond the lower limit of condition (1), as the zoom ratio is increased more than two times, the total additional movement of the second lens unit II becomes too long, and variation with zooming of the aberrations increases objectionably. When the upper limit is exceeded, the zoom ratio is not sufficiently increased and the technical significance of moving the second lens unit II is lessened.

As has been described above, according to the present invention, as applied to the zoom lens including three lens units of positive, negative and positive powers with the axial air separations between the successive two of these three lens units being varied to effect zooming, a large increase in the zoom ratio can be achieved in such an easy way as to further move only the second lens unit from the telephoto end of the standard zooming range, while still preventing the entire lens system from increasing in the longitudinal direction.

Examples of specific zoom lenses can be constructed in accordance with the numerical data given in the following tables for the radii of curvature, R, the axial thicknesses and air separations, D, and the refractive indices, N, and Abbe numbers, $\nu$, of the glasses of the various lens elements with the subscripts numbered consecutively from front to rear.

In example 1, the first range of variation of the focal length f is f=77.9-194.0, and the second range is between f=194 and f=342. For this second range, the value $\beta$ of the lateral magnification of the second lens unit as the factor in the inequalities of condition (1) is −0.75, and the required amount of additional movement of the second lens unit is 17.

In example 2, the first range is f=36.2-101.8, and the second range is between f=101.8 and f=151.5. For this, the value $\beta$ of the lateral magnification is −0.82, and the required amount of additional movement is 7.65.

It is also in example 2 that R24 is a movable stop for removing flare when zooming, and R6 and R23 are aspherical surfaces.

An equation for the aspherical surface or axial deviation $\bar{x}$ from the spherical surface as the reference is expressed as:

$$\bar{x} = \bar{r}\left\{1 - \left(1 - \frac{H^2}{\bar{r}^2}\right)^{\frac{1}{2}}\right\} + AH^2 + BH^2 + CH^6 + DH^8 + EH^{10}$$

where $\bar{r}$ is the radius of curvature of the reference spherical surface, and A,B C,D and E are the aspherical coefficients.

NUMERICAL EXAMPLE 1

| F = 77.9 − 342 FNO = 1:4.6 − 6.5 2ω = 31.0 − 7.2° | | | |
|---|---|---|---|
| R1 = 166.15 | D1 = 4.51 | N1 = 1.74950 | ν1 = 35.3 |
| R2 = 61.42 | D2 = 7.70 | N2 = 1.60311 | ν2 = 60.7 |
| R3 = 1589.87 | D3 = 0.10 | | |
| R4 = 105.55 | D4 = 5.03 | N3 = 1.48749 | ν3 = 70.2 |
| R5 = −461.38 | D5 = Variable | | |
| R6 = −536.53 | D6 = 1.66 | N4 = 1.80400 | ν4 = 46.6 |
| R7 = 48.27 | D7 = 4.81 | | |
| R8 = −49.95 | D8 = 1.42 | N5 = 1.77250 | ν5 = 49.6 |
| R9 = 31.81 | D9 = 3.12 | N6 = 1.84666 | ν6 = 23.9 |
| R10 = 660.84 | D10 = Variable | | |
| R11 = Stop | D11 = 1.48 | | |
| R12 = 97.50 | D12 = 3.56 | N7 = 1.69680 | ν7 = 55.5 |
| R13 = −126.56 | D13 = 0.12 | | |
| R14 = 62.56 | D14 = 8.84 | N8 = 1.48749 | ν8 = 70.2 |
| R15 = −46.04 | D15 = 1.98 | N9 = 1.74950 | ν9 = 35.3 |
| R16 = 280.77 | D16 = 0.73 | | |
| R17 = 26.35 | D17 = 2.91 | N10 = 1.75520 | ν10 = 27.5 |
| R18 = 22.20 | D18 = 4.43 | N11 = 1.48749 | ν11 = 70.2 |
| R19 = 46.70 | D19 = 28.18 | | |
| R20 = 102.32 | D20 = 3.53 | N12 = 1.53358 | ν12 = 51.6 |
| R21 = −80.99 | D21 = 5.53 | | |
| R22 = −22.21 | D22 = 1.10 | N13 = 1.77250 | ν13 = 49.6 |
| R23 = −79.29 | D23 = 10.02 | | |
| R24 = 143.09 | D24 = 8.77 | N14 = 1.54739 | ν14 = 53.6 |
| R25 = −70.94 | | | |

LENS SEPARATIONS DURING ZOOMING

| f | 77.9 | 194 | 342 |
|---|---|---|---|
| D5 | 0.90 | 59.16 | 76.21 |
| D10 | 31.56 | 18.31 | 45.09 | f1 = 136.77  
f2 = −29.49  
f3 = 54.53 where f1, f2 and f3 are the focal lengths of the first, second and third lens units counting from front, respectively.

NUMERICAL EXAMPLE 2

| F = 36.2 − 151.5 FNO = 1:3.6 − 4.9 2ω = 34.9 − 8.1 | | | |
|---|---|---|---|
| R1 = 122.62 | D1 = 2.29 | N1 = 1.80518 | ν1 = 25.4 |
| R2 = 55.20 | D2 = 8.86 | N2 = 1.51633 | ν2 = 64.1 |
| R3 = −145.97 | D3 = 0.12 | | |
| R4 = 43.08 | D4 = 4.07 | N3 = 1.60311 | ν3 = 60.7 |
| R5 = 141.28 | D5 = Variable | | |
| R6 = 973.31 | D6 = 0.86 | N4 = 1.88300 | ν4 = 40.8 |
| R7 = 18.54 | D7 = 4.30 | | |
| R8 = −46.41 | D8 = 1.17 | N5 = 1.88300 | ν5 = 40.8 |
| R9 = 144.09 | D9 = 0.02 | | |
| R10 = 33.03 | D10 = 4.57 | N6 = 1.84666 | ν6 = 23.9 |
| R11 = −39.32 | D11 = 0.74 | | |
| R12 = −25.87 | D12 = 1.17 | N7 = 1.81600 | ν7 = 46.6 |
| R13 = −167.89 | D13 = Variable | | |
| R14 = Stop | D14 = 1.00 | | |
| R15 = 62.90 | D15 = 3.00 | N8 = 1.65160 | ν8 = 58.6 |
| R16 = −85.49 | D16 = 0.10 | | |
| R17 = 49.49 | D17 = 3.00 | N9 = 1.69680 | ν9 = 55.5 |
| R18 = 85.26 | D18 = 0.10 | | |
| R19 = 21.71 | D19 = 10.85 | N10 = 1.53358 | ν10 = 51.6 |
| R20 = −93.41 | D20 = 1.40 | N11 = 1.84666 | ν11 = 23.9 |
| R21 = 21.03 | D21 = 1.40 | | |
| R22 = 127.73 | D22 = 3.30 | N12 = 1.60342 | ν12 = 38.0 |
| R23 = −39.37 | D23 = Variable | | |
| R24 = Movable stop | D24 = Variable | | |
| R25 = −20.96 | D25 = 1.10 | N13 = 1.80400 | ν13 = 46.6 |
| R26 = 90.07 | D26 = 5.13 | N14 = 1.74400 | ν14 = 44.7 |
| R27 = −21.26 | | | |

LENS SEPARATIONS DURING ZOOMING

| f | 36.2 | 101.8 | 151.5 |
|---|---|---|---|
| D5 | 2.51 | 20.43 | 28.08 |
| D13 | 26.57 | 8.65 | 1.00 |
| D23 | 0.71 | 8.95 | 8.95 |
| D24 | 3.02 | 13.90 | 13.90 | f1 = 68.38  
f2 = −19.11  
f3 = 31.17  
f4 = 1267.3

| Aspherical Coefficients | |
|---|---|
| A6 = 0 | A23 = 0 |
| B6 = −2.133 × $10^{-7}$ | B23 = 1.308 × $10^{-5}$ |
| C6 = 5.057 × $10^{-9}$ | C23 = 1.007 × $10^{-8}$ |

Figure 7:
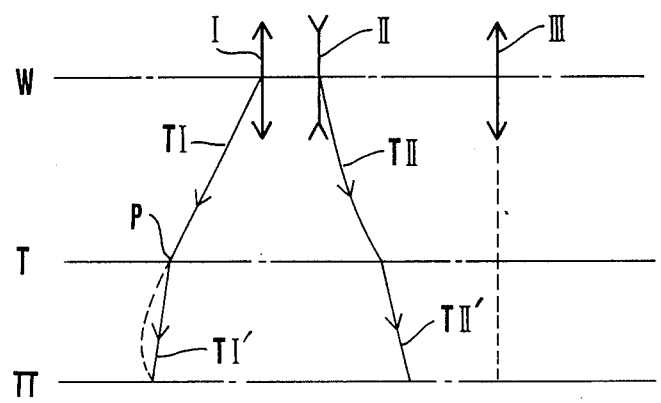
FIGS. 7 and 8 are diagrams of the optical arrangement of third and fourth embodiments of the invention respectively.
Figure 8:
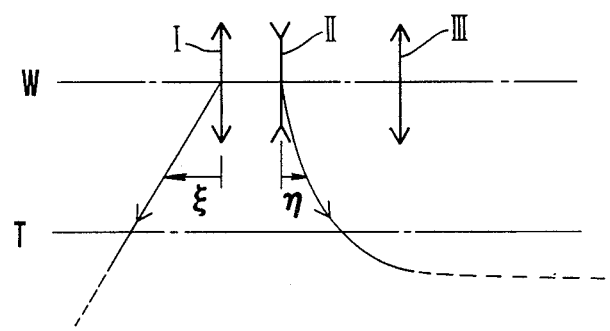

In FIG. 7, there is shown a third embodiment of the invention applied to the zoom lens comprising, from front to rear, a first lens unit I of positive power, a second lens unit II of negative power and a third lens unit III of positive power, wherein for a first range of variation of the focal length of the entire system, as zooming from a wide angle end W to a telephoto end T, the first lens unit I is moved axially forward at a constant speed so as to depict a linear locus TI, while the second lens unit II is simultaneously moved axially rearward at varying speeds so as to depict a non-linear locus TII. For a second range, the first and second lens units I and II are further moved axially from the telephoto end T of the first range, taking different loci TI' and TII' respectively from those TI and TII for the first range and arrive at a super telephoto end TT of a longer focal length than the longest of the first range. Thus, an extension of the standard zooming range is achieved. If the latter loci TI' and TII' were made assimilate the former loci TI and TII in such a way as in the prior art, that is, the first lens unit I as the variator and the second lens unit II as the compensator, it would result in some cases that the image forming principle of the varifocal system is broken at a certain zooming position. For example, as shown in FIG. 8, the ratio of the movement, $\eta$, of the second lens unit II to the movement, $\xi$, of the first lens unit I, or $d\eta/d\xi$, has an infinite value for that zooming position. Hence, the use of a mere extension of the conventional loci of movement no longer provides the possibility of establishing any varifocal system. So, in this embodiment, as shown in FIG. 7, when to move the first and second lens units I and II beyond the telephoto end T, use is made of different loci of movement TI' and TII' from the normal loci of movement TI and TII respectively, for example, linear loci until the super telephoto end TT, only at which the image forming relationship is established in the varifocal system. Thus, an extension of the standard zooming range is achieved.

Figure 9:
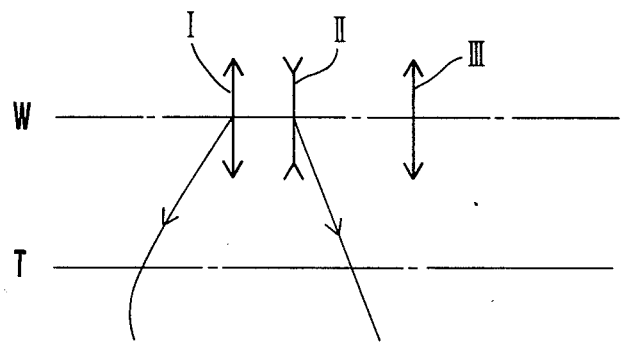
FIGS. 9 and 10 are explanatory of the paraxial optical arrangements of zoom lenses of the invention respectively.

In another type of the 3-unit zoom lens in which the first lens unit I is moved axially forward monotonously, while the second lens unit II is moved axially rearward linearly, as shown in FIG. 9, when in the first range of variation of the focal length, there is an extended zooming position, for example, just beyond the telephoto end T at which the movement of the first lens unit I must change its direction. Or otherwise, the varifocal system would lose the image forming principle. This implies that the zoom ring on the lens barrel must be reciprocatingly moved to extend the standard zooming range. Such a manipulation of the zoom actuator is far more uncomfortable than when one-way movement of the zoom actuator suffices for zooming over the extended range.

So, in this embodiment of FIG. 7, use is made of a linear locus of movement TI' for the first lens unit I as bent to the preceding locus of movement TI at the position of the telephoto end T which occurs near the position at which the movement of the first lens unit I will change its direction, so that as shown in FIG. 7, the additional movement of the first lens unit from the telephoto end T can take the same direction, in this instance, forward, until the super telephoto end TT is reached.

Figure 10:
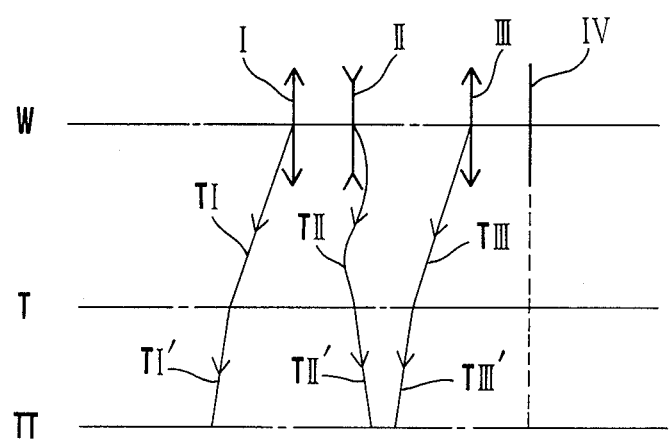
Figure 12A:
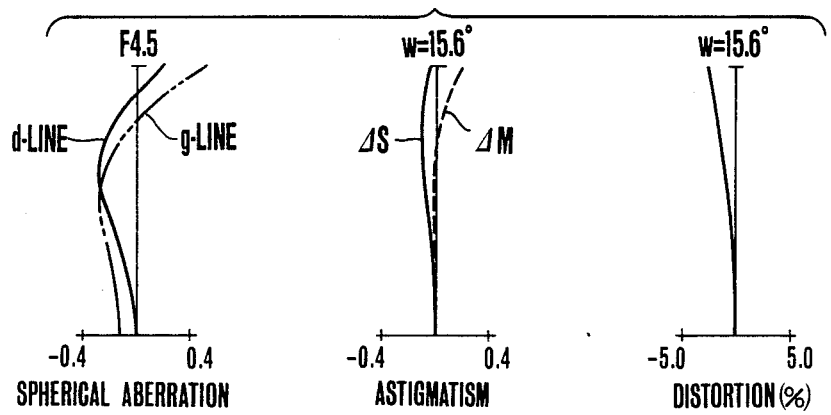
FIGS. 12A to 12C and 14A to 14C are graphic representations of the various aberrations of the lenses of FIGS. 11 and 13 respectively.
Figure 12B:
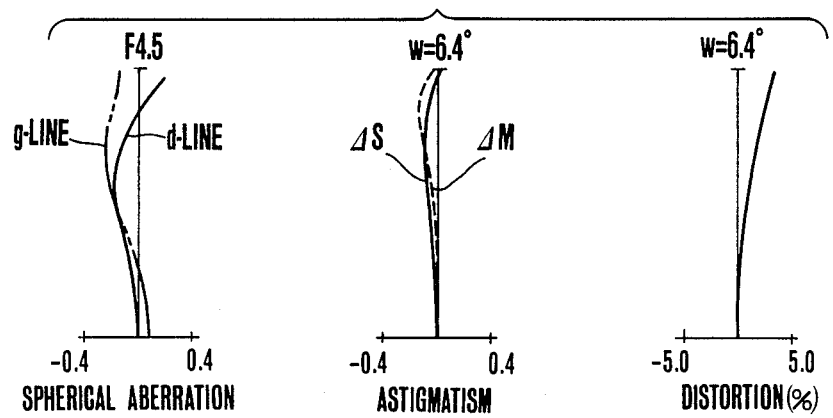
Figure 12C:
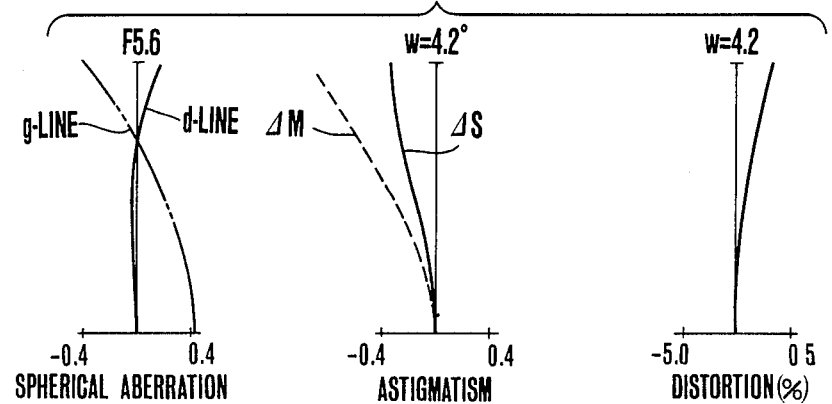
Figure 13:
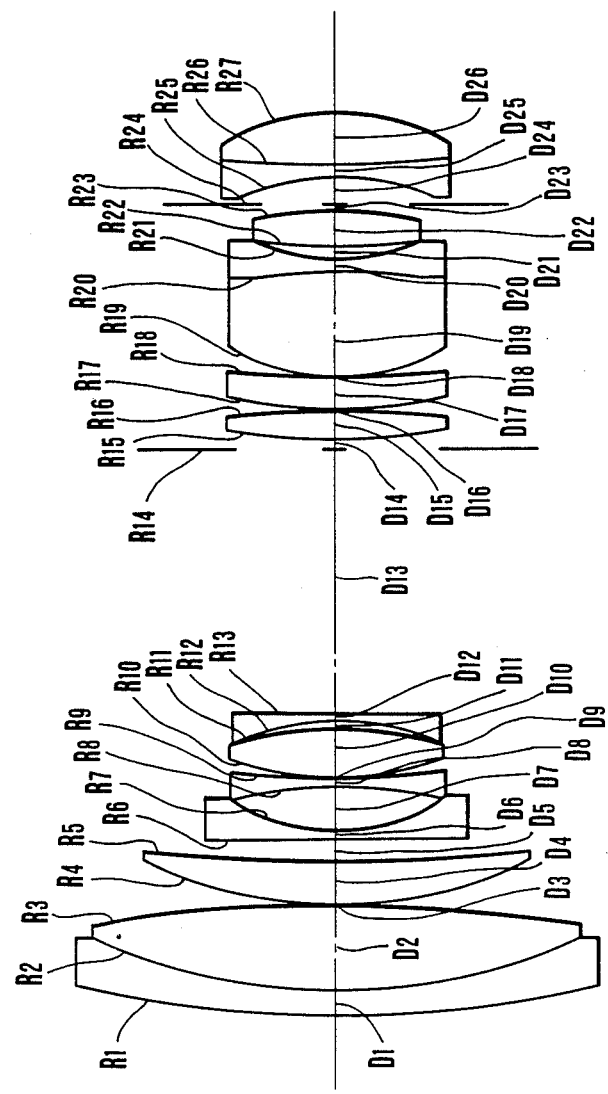
Figure 14A:
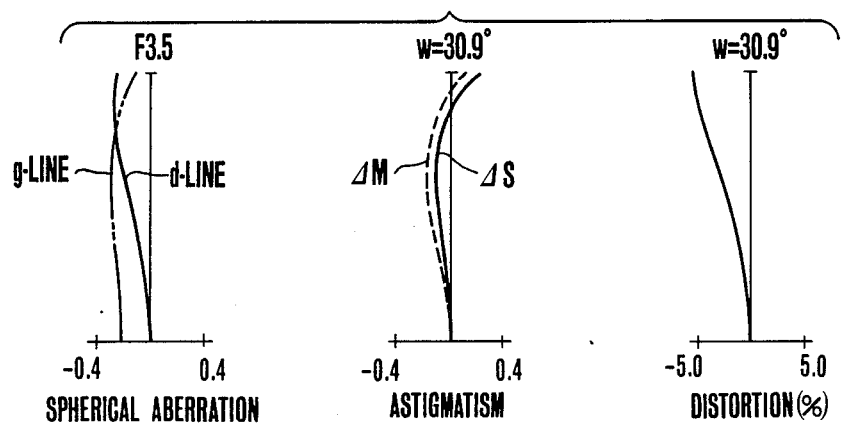
Figure 14B:
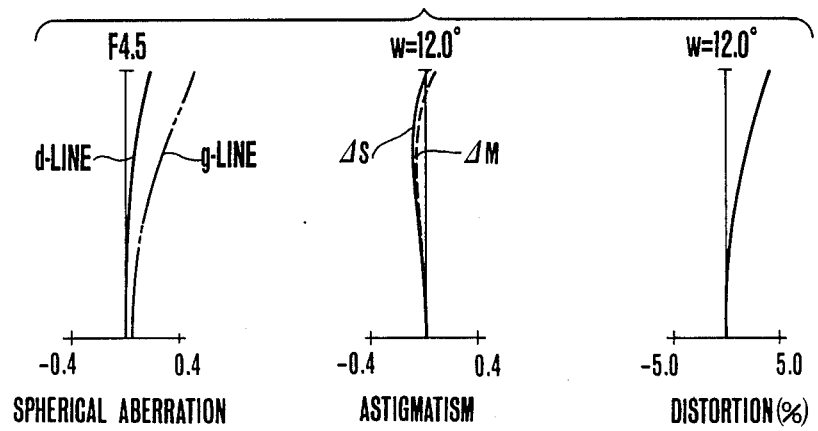
Figure 14C:
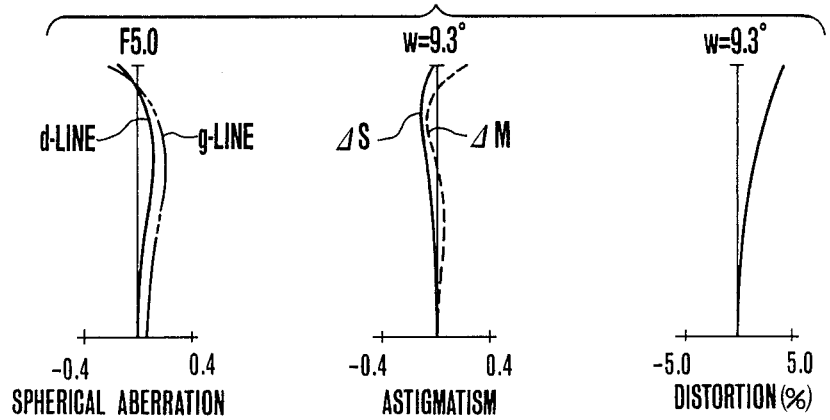

FIG. 10 schematically illustrates the paraxial optical arrangement of a fourth embodiment of the invention applied to the zoom lens comprising, from front to rear, a first lens unit I of positive power, a second lens unit II of negative power, a third lens unit III of positive power and a fourth lens unit IV of positive or negative power, the first and third lens units I and III being moved axially forward linearly so as to depict loci of movement TI and TIII respectively, while the second lens unit II being axially moved non-linearly so as to depict a locus of movement TII, to effect zooming for a first range from a wide angle end W to a telephoto end T. Then, from the telephoto end T of the first range, the first, second and third lens units I, II and III are further moved by different loci of movement TI', TII' and TIII' from the loci of movement TI, TII and TIII for the first range to effect zooming for a second range to a super telephoto end TT. Thus, an extension of the standard zooming range is achieved. In this embodiment, too, as has been described in connection with FIG. 8, when the direction of additional movement of the first lens unit I remains unchanged from forward, the image forming principle of the varifocal system is broken at a zooming position. Therefore, it is across this zooming position that the first three lens units I, II and III are moved in the different loci from those for the first range when in the second range.

Though, in this embodiment, the fourth lens unit IV is not particularly necessary to use, it is preferred to use it when the various aberrations are reduced throughout the extended zooming range.

In the third and fourth embodiments, to achieve a good compromise between the requirements of achieving good stability of aberration correction throughout the first and second ranges or the extended range and of shortening the zoom lens in the longitudinal direction it is desirable to satisfy the following condition:

$$1.2 < \frac{Z}{Z1} < 1.8 \qquad (2)$$

where Z1 is the zoom ratio of the first range, and Z is the overall zoom ratio of the first and second ranges. When the ratio of the first range is increased beyond the upper limit of condition (2), the so-called ordinary zooming range is too narrow, and, instead, an unduly large burden is laid on the second range so that it is difficult to perform good correction of aberrations for the super telephoto end. When the first range is too wide as exceeding the lower limit of the condition (2), the movement of the first lens unit is increased which causes the total length of the lens to increase objectionably.

For note, in the embodiments of FIGS. 7 and 10, the second range is not always necessary to start from the telephoto end of the first range, but may be made to start from a zooming position of relatively small aberrations near the telephoto end.

Also, after the second range has been carried out, all the zoom units may be further moved non-linearly to effect zooming in a third range.

According to the foregoing or third or fourth embodiment, the first lens unit is moved forward at monotonously increasing speeds to effect zooming in a first range, and a second range is carried out across either a position at which the image forming principle of the varifocal system is broken, or a point of transition at which the first lens unit reciprocates, thereby it being made possible to realize a zoom lens of high range with good manipulation for zooming.

Examples of specific zoom lenses can be constructed in accordance with the numerical data given in the following tables for the radii of curvature, R, the axial thicknesses and air separations, D, and the refractive indices, N, and Abbe numbers, $\nu$, of the glasses of the various lens elements with the subscripts numbered consecutively from front to rear.

In numerical example 3, the first range of variation of the focal length f is $f=77.6-194$, and the second range is between $f=194$ and $f=295$. The required amounts of additional movement of the first and second lens units for the second range are 1.7 and 11.6 respectively.

In numerical example 4, the first range is f=36.2 −101.8, and the second range is between f=101.8 and f=132.4. For this second range, the required amounts of movement of the first, second and third lens units are 2.1, 2.5 and 2.1 respectively.

Also in numerical example 4, R24 is a movable stop for removing flare when zooming. Also, R6 and R23 are aspherical surfaces.

An equation for the aspherical surface or axial deviation $\bar{x}$ from the reference spherical surface at a height H from the optical axis is expressed as:

$$\bar{x} = \bar{r}\left\{1 - \left(1 - \frac{H^2}{\bar{r}^2}\right)^{\frac{1}{2}}\right\} + AH^2 + BH^2 + CH^6 + DH^8 + EH^{10}$$

where $\bar{r}$ is the radius of curvature of the reference spherical surface, and A, B, C, D and E are the aspherical coefficients.

fi is the focal length of the i-th lens unit counting from front.

NUMERICAL EXAMPLE 3

| F = 77.6 − 294.9 FNO = 1:4.5 − 5.6 2ω = 31.2° − 8.4° | | | |
|---|---|---|---|
| R1 = 186.99 | D1 = 2.60 | N1 = 1.80518 | ν1 = 25.4 |
| R2 = 90.65 | D2 = 7.80 | N2 = 1.60311 | ν2 = 60.7 |
| R3 = −495.06 | D3 = 0.10 | | |
| R4 = 111.68 | D4 = 4.00 | N3 = 1.49831 | ν3 = 65.0 |
| R5 = 1313.91 | D5 = Variable | | |
| R6 = −1965.21 | D6 = 3.00 | N4 = 1.76182 | ν4 = 26.6 |
| R7 = −54.06 | D7 = 1.50 | N5 = 1.83400 | ν5 = 37.2 |
| R8 = 49.19 | D8 = 2.83 | | |
| R9 = −44.17 | D9 = 1.50 | N6 = 1.77250 | ν6 = 49.6 |
| R10 = 35.04 | D10 = 3.00 | N7 = 1.84666 | ν7 = 23.9 |
| R11 = −1012.10 | D11 = Variable | | |
| R12 = Stop | D12 = 1.59 | | |
| R13 = 77.10 | D13 = 5.00 | N8 = 1.51633 | ν8 = 64.1 |
| R14 = −45.52 | D14 = 0.10 | | |
| R15 = 45.54 | D15 = 6.60 | N9 = 1.48749 | ν9 = 70.2 |
| R16 = −34.30 | D16 = 1.98 | N10 = 1.80610 | ν10 = 40.9 |
| R17 = 85.82 | D17 = 0.10 | | |
| R18 = 25.20 | D18 = 2.92 | N11 = 1.76182 | ν11 = 26.6 |
| R19 = 21.32 | D19 = 5.29 | N12 = 1.51633 | ν12 = 64.1 |
| R20 = 133.71 | D20 = 26.76 | | |
| R21 = −95.28 | D21 = 3.53 | N13 = 1.56732 | ν13 = 42.8 |
| R22 = −43.61 | D22 = 2.79 | | |
| R23 = −17.31 | D23 = 1.10 | N14 = 1.77250 | ν14 = 49.6 |
| R24 = −36.66 | D24 = 8.47 | | |
| R25 = 128.49 | D25 = 3.78 | N15 = 1.78472 | ν15 = 25.7 |
| R26 = 7255.88 | | | |

| f | 77.6 | 194 | 295 |
|---|---|---|---|
| D5 | 1.16 | 59.65 | 72.99 |
| D11 | 26.56 | 13.18 | 1.58 | f1 = 136.77
f2 = −29.49
f3 = 38.36

NUMERICAL EXAMPLE 4

| F = 36.2 − 132.4 FNO = 1:3.5 − 5.0 2ω = 30.9 − 18.6 | | | |
|---|---|---|---|
| R1 = 122.62 | D1 = 2.29 | N1 = 1.80518 | ν1 = 25.4 |
| R2 = 55.20 | D2 = 8.86 | N2 = 1.51633 | ν2 = 64.1 |
| R3 = −145.97 | D3 = 0.12 | | |
| R4 = 43.08 | D4 = 4.07 | N3 = 1.60311 | ν3 = 60.7 |
| R5 = 141.28 | D5 = Variable | | |
| R6 = 973.31 | D6 = 0.86 | N4 = 1.88300 | ν4 = 40.8 |
| R7 = 18.54 | D7 = 4.30 | | |
| R8 = −46.41 | D8 = 1.17 | N5 = 1.88300 | ν5 = 40.8 |
| R9 = 144.09 | D9 = 0.02 | | |
| R10 = 33.03 | D10 = 4.57 | N6 = 1.84666 | ν6 = 23.9 |
| R11 = −39.32 | D11 = 0.74 | | |
| R12 = −25.87 | D12 = 1.17 | N7 = 1.81600 | ν7 = 46.6 |
| R13 = −167.89 | D13 = Variable | | |
| R14 = Stop | D14 = 1.00 | | |
| R15 = 62.90 | D15 = 3.00 | N8 = 1.65160 | ν8 = 58.6 |
| R16 = −85.49 | D16 = 0.10 | | |
| R17 = 49.49 | D17 = 3.00 | N9 = 1.69680 | ν9 = 55.5 |
| R18 = 85.26 | D18 = 0.10 | | |
| R19 = 21.71 | D19 = 10.85 | N10 = 1.53358 | ν10 = 51.6 |
| R20 = −93.41 | D20 = 1.40 | N11 = 1.84666 | ν11 = 23.9 |
| R21 = 21.03 | D21 = 1.40 | | |
| R22 = 127.73 | D22 = 3.30 | N12 = 1.60342 | ν12 = 38.0 |
| R23 = −39.37 | D23 = Variable | | |
| R24 = Movable stop | D24 = Variable | | |
| R25 = −20.96 | D25 = 1.10 | N13 = 1.80400 | ν13 = 46.6 |
| R26 = 90.07 | D26 = 5.13 | N14 = 1.74400 | ν14 = 44.7 |
| R27 = −21.26 | | | |

| f | 36.2 | 101.8 | 132.4 |
|---|---|---|---|
| D5 | 2.51 | 20.43 | 25.08 |
| D13 | 26.57 | 8.65 | 4.00 |
| D23 | 0.71 | 8.95 | 8.95 |
| D24 | 3.02 | 13.90 | 16.00 | f1 = 68.38
f2 = −19.11
f3 = 31.17
f4 = 1267.3

Aspherical Coefficients

| | |
|---|---|
| A6 = 0 | A23 = 0 |
| B6 = −2.133 × $10^{-7}$ | B23 = 1.308 × $10^{-5}$ |
| C6 = 5.057 × $10^{-9}$ | C23 = 1.007 × $10^{-5}$ |

What is claimed is:

1. A zoom lens comprising, from front to rear, a first lens unit of positive power adjacent an object side, a second lens unit of negative power and a third lens unit of positive power, said zoom lens having a standard range of focal length and a focal length range beyond the standard range, wherein for the standard range of variation of the focal length, at least said first and said second lens units are moved simultaneously and independently of each other, and to obtain the focal length range beyond the standard range, at least said second lens unit is moved and the locus of movement of said first lens unit is moved linearly forward and reaches a point of discontinuity when the endpoint of the standard range has been attained.

2. A zoom lens according to claim 1, wherein said first lens unit stands still when the standard range is exceeded.

3. A zoom lens according to claim 1, wherein said first lens unit moves at the same time as, and independently of, said second lens unit after the standard range is exceeded.

4. A zoom lens according to claim 1, further comprising a fourth lens unit adjacent an image side of said third lens unit, wherein said third lens unit moves at the same time as said first lens unit and said second lens unit to obtain a focal length beyond the standard range.

5. A zoom lens according to claim 1, wherein said second lens unit moves through a range including a position at which the lateral magnification of said second lens unit takes a value of −1 times to obtain a focal length beyond the standard range.

6. A zoom lens according to claim 1, wherein another lens unit is provided on the image side of said first lens unit.

7. A zoom lens comprising, from front to rear, a first lens unit of positive power adjacent an object side, a second lens unit of negative power and a third lens unit of positive power, said zoom lens having two ranges of focal length that are discontinuous and separate, the separation between said first and said second lens units and the separation between said second and said third lens units each being varied to carry out the first range of variation of the focal length, and said second lens unit being moved in a discontinuous path from the telephoto end of said first range through a path including a position at which the lateral magnification of said second lens unit takes a value of -1 times to carry out the second range of variation of the focal length.

8. A zoom lens according to claim 7, wherein said second lens satisfies the following condition:

$$0.7 \leq |\beta| \leq 0.95$$

where $\beta$ is the lateral magnification of said second lens unit at the telephoto end of the first range of variation of the focal length.

9. A zoom lens comprising, from front to rear, a first lens unit of positive power adjacent an object side, a second lens unit of negative power and a third lens unit of positive power, said zoom lens having two ranges of focal length, said first lens unit being moved forward monotonously while said second lens unit is moved to carry out the first range of variation of the focal length, and to carry out the second range of variation of the focal length said first and said second lens units are moved by different loci of movement from those for the first range from a position near the telephoto end of the first range, said first and said second lens units being moved across a position which does not constitute a varifical system within the second range of variation of the focal length.

10. A zoom lens comprising, from front to rear, a first lens unit of positive power adjacent and object side, a second lens unit of negative power and a third lens unit of positive power, said zoom lens having two ranges of focal length, said first lens unit being moved forward monotonously while said second lens unit is moved to carry out a first range of variation of the focal length, and to carry out the second range of variation of the focal length, said first and said second lens units are moved by different loci of movement from those for the first range from a position near the telephoto end of the first range, said first lens unit being moved across a position at which the movement of said first lens unit changes its direction within the second range of variation of the focal length.

11. A zoom lens according to any one of claims 9 and 10, satisfying the following condition:

$$1.2 < Z/Z1 < 1.8$$

where Z1 is the zoom ratio of the first range, and Z is the combined zoom ratio of the first and second ranges.

12. A zoom lens according to claim 1, wherein the locus of movement of said first lens unit is changed through a point of discontinuity when the standard range has been exceeded.

13. A zoom lens according to claim 7, wherein for the first of the two ranges of variation of focal length, at least said first and second lens units are moved simultaneously and independently of each other.

* * * * *

UNITED STATES PATENT AND TRADEMARK OFFICE
CERTIFICATE OF CORRECTION

PATENT NO. : 4,865,434

DATED : September 12, 1989

INVENTOR(S) : Matsushita, et al.

It is certified that error appears in the above-identified patent and that said Letters Patent is hereby corrected as shown below:

ON THE TITLE PAGE

[56] References Cited:

FOREIGN PATENT DOCUMENTS

"222910 11/60 Austria" should read --222910 8/62 Austria--.

COLUMN 3:

Line 22, "$1/\beta^2$ times" should read --$1/\beta^2$ times.--

Line 51, "contributed" should read --contributing--.

Line 55, "When" should read --when--.

COLUMN 5:

Line 37, "$AH^2+BH^2+CH^6+DH^8+EH^{10}$" should read --$AH^2+BH^4+CH^6+DH^8+EH^{10}$--.

Line 40, "A,B C,D" should read --A,B,C,D--.

UNITED STATES PATENT AND TRADEMARK OFFICE
CERTIFICATE OF CORRECTION

PATENT NO. : 4,865,434

DATED : September 12, 1989

INVENTOR(S) : Matsushita et al.

It is certified that error appears in the above-identified patent and that said Letters Patent is hereby corrected as shown below:

COLUMN 6:

NUMERICAL EXAMPLE 2

In the heading, "$2\omega = 34.9 - 8.1$" should read --$2\omega = 30.9 - 8.1$--.

COLUMN 7:

Line 10, "assimilate" should read --to assimilate--.

COLUMN 9:

Line 17, "$AH^2+BH^2+CH^6+DH^8+EH^{10}$" should read --$AH^2+BH^4+CH^6+DH^8+EH^{10}$--.

COLUMN 12:

Line 4, "varifical" should read --varifocal--.

UNITED STATES PATENT AND TRADEMARK OFFICE
CERTIFICATE OF CORRECTION

PATENT NO. : 4,865,434

DATED : September 12, 1989

INVENTOR(S) : Matsushita et al.

It is certified that error appears in the above-identified patent and that said Letters Patent is hereby corrected as shown below:

Column 12:

Line 7, "and" should read --an--.

Signed and Sealed this

Eighteenth Day of February, 1992

*Attest:*

HARRY F. MANBECK, JR.

*Attesting Officer*     *Commissioner of Patents and Trademarks*